June 29, 1926. 1,590,862
J. R. SEAQUIST
ROAD MAP AND HOLDER
Filed Dec. 27, 1923  2 Sheets-Sheet 1
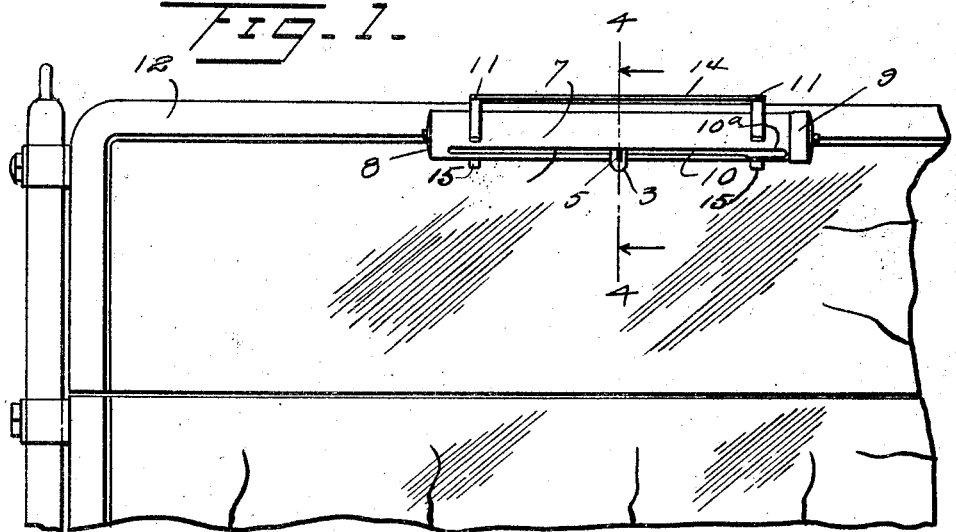
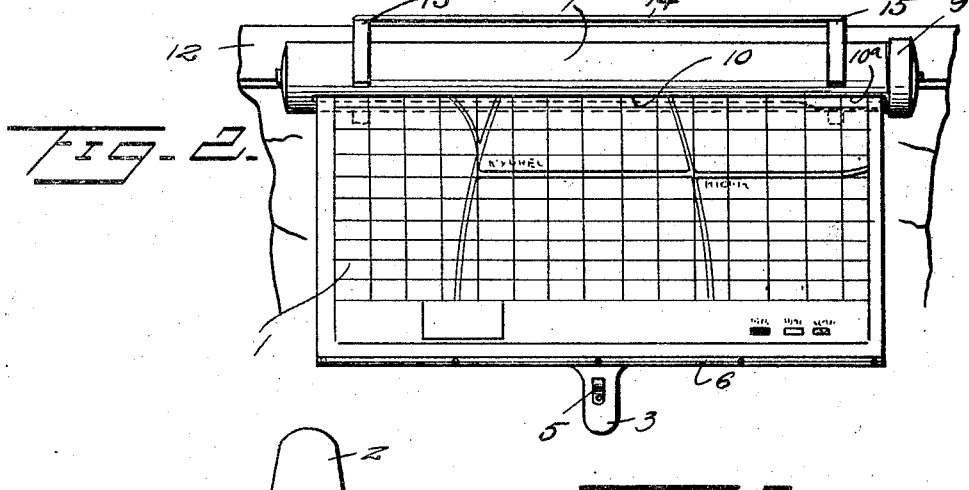
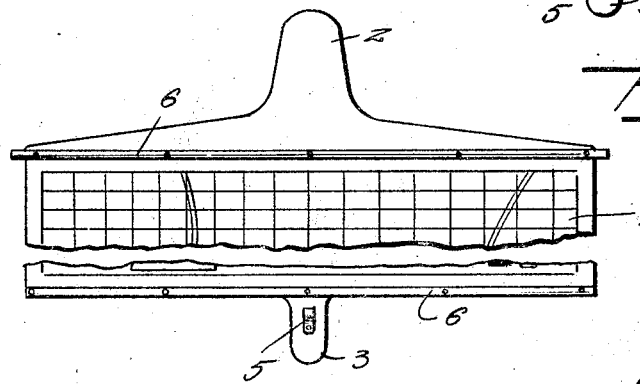
Inventor
J. R. Seaquist

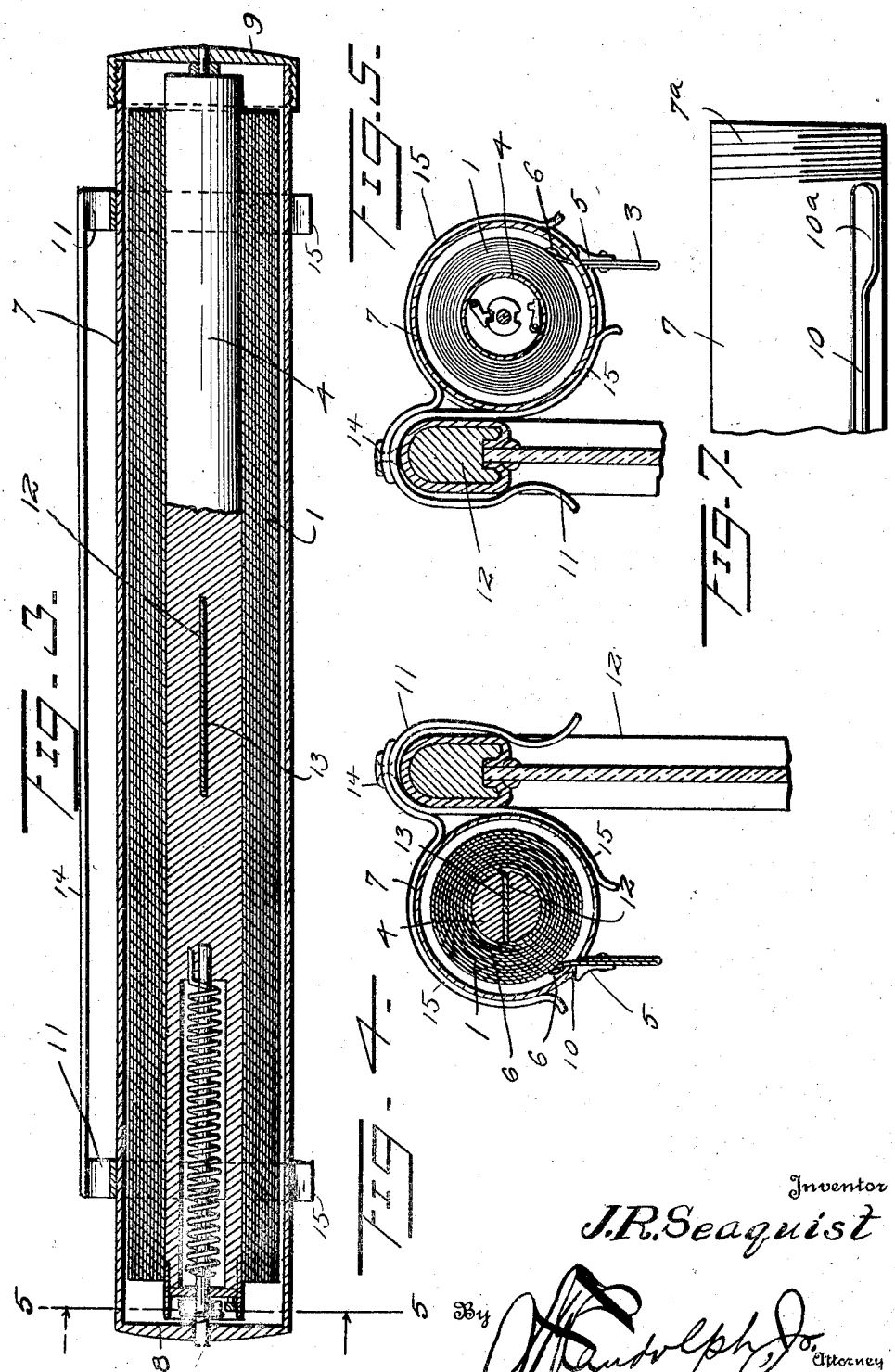

Patented June 29, 1926.

1,590,862

UNITED STATES PATENT OFFICE.

JOHN R. SEAQUIST, OF SISTER BAY, WISCONSIN.

ROAD MAP AND HOLDER.

Application filed December 27, 1923. Serial No. 683,003.

The present invention has for its object the provision of a road map for tourists which obviates the objections incident to maps of this nature which require to be folded and which are inconvenient to handle and difficult to read at times because of fold lines which ultimately result in a weakening of the map and a breaking or tearing thereof along the crease lines.

In accordance with the present invention, the map is provided in strip form with tabs at opposite ends, said strip being wound upon a spring roller which is disposed within the case having a slot in a side thereof through which the map is drawn for inspection.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:—

Figure 1 is a front view of the map and holder, showing the same attached to the windshield of a motor vehicle.

Figure 2 is a view similar to Figure 1, showing the holder attached to the dash or other part of a closed car and the map partly drawn from the holder, Figure 3 is a central longitudinal section of the map and holder, a portion of the roller being shown in full lines, Figure 4 is an enlarged sectional detail view on the line 4—4 of Figure 1, Figure 5 is a sectional detail view on the line 5—5 of Figure 3, showing the holder attached to the windshield, Figure 6 is a detail view of opposite end portions of the map, showing the tabs and reinforcements, and Figure 7 is a detail view of an end portion of the casing showing the threaded end and the enlarged end of the slot in the side thereof.

Corresponding and like parts are referred to in the following description and designated in the several views of the drawings by like reference characters.

The map is printed upon a strip 1, the parts being such as to prevent the rays of light penetrating the strip and interfering with the ready reading of the map and data associated therewith. Tabs 2 and 3 are provided at opposite ends of the strip, the tab 2 serving as convenient means for attaching the strip to a spring roller 4 and the tab 3 providing convenient means for drawing the map from the holder. A suitable stop 5 is provided on the tab 3 to prevent said tab from being drawn into the holder. Strips 6 are applied to opposite end portions of the strip and serve to stiffen and reinforce the same.

The holder consists of a cylindrical casing 7 which is closed at one end, as indicated at 8, and provided at its opposite end with a removable cap 9. A longitudinal slot 10 is formed in a side of the casing and provides an outlet for the map. U-shaped spring clips 11 or analogous means are attached to the casing 7 and serve as supporting means for attaching the holder to the frame 12 of a windshield or other convenient part of the vehicle.

The roller 4 is of the spring type such as commonly provided for window shades and is mounted at one end in the closed end 8 of the holder and at its opposite end in the cap 9. A slot 13 is formed in the roller 4 to receive the tab 2, the latter serving as convenient means for attaching the map to the roller.

It will be understood from the foregoing taken in connection with the accompanying drawings that the map may be readily and conveniently handled and is free from folds or creased lines and may be readily inspected either by the driver or the occupant of the vehicle depending upon the location of the map and holder. The spring roller provides ready means for rerolling the map when required, and any portion withdrawn from the roller may be held in convenient position for observation.

The clips 11 are connected by means of a strip 14, offset from map holder 12 which forms a tie therefor and other clips 15 are provided to engage the casing 7, said clips 11 and 15 and strip 14 being secured together by common means. This enables the casing to be readily detached so that the map may be passed to other occupants of the vehicle for inspection. It is also observed that the map may be reversed for inspecting other maps or data on the reverse side of the strip. The cap 9 being removable, provides for a ready changing of the map as required. The tie 14 and clips 11 and 15 constitute a clamp or spring clip which admits of the holder being easily placed in position or removed from the windshield or other support.

The slot 10 does not extend through the end of the casing 7 but terminates just inside the threaded end 7ᵃ and is enlarged at 10ᵃ to receive the tab 3 and stop 5 when placing the map in position or removing it from the casing.

What is claimed is:—

1. A device of the class described comprising a roller, a holder, spaced U-shaped clips adapted to engage a support, second clips, said second clips extending from the first mentioned clips and coacting with an arm thereof to detachably clasp the holder, a connecting bar for the clips offset with respect to the holder, and common means common to and securing the connecting bar and first and second mentioned clips together.

2. A road map having reinforcements and tabs extending therefrom at opposite ends of the map, a roller, a map member adapted to be wound thereon, said roller being provided with a slot to receive one of said tabs, a cylindrical casing closed at one end having a cap fitted to its opposite end and provided in a side with an opening to permit the map member being drawn therethrough, the roller and map being disposed within the casing, the roller being journaled in the closed end of the cap of the casing, spring clips applied to the casing to attach the same to a support, and a tie member offset with respect to the casing bridging said clips.

In testimony whereof I affix my signature.

JOHN R. SEAQUIST.